T. F. O'BRIEN.
SPRING FELLY AUTOMOBILE WHEEL.
APPLICATION FILED DEC. 22, 1910.
1,013,949.
Patented Jan. 9, 1912.
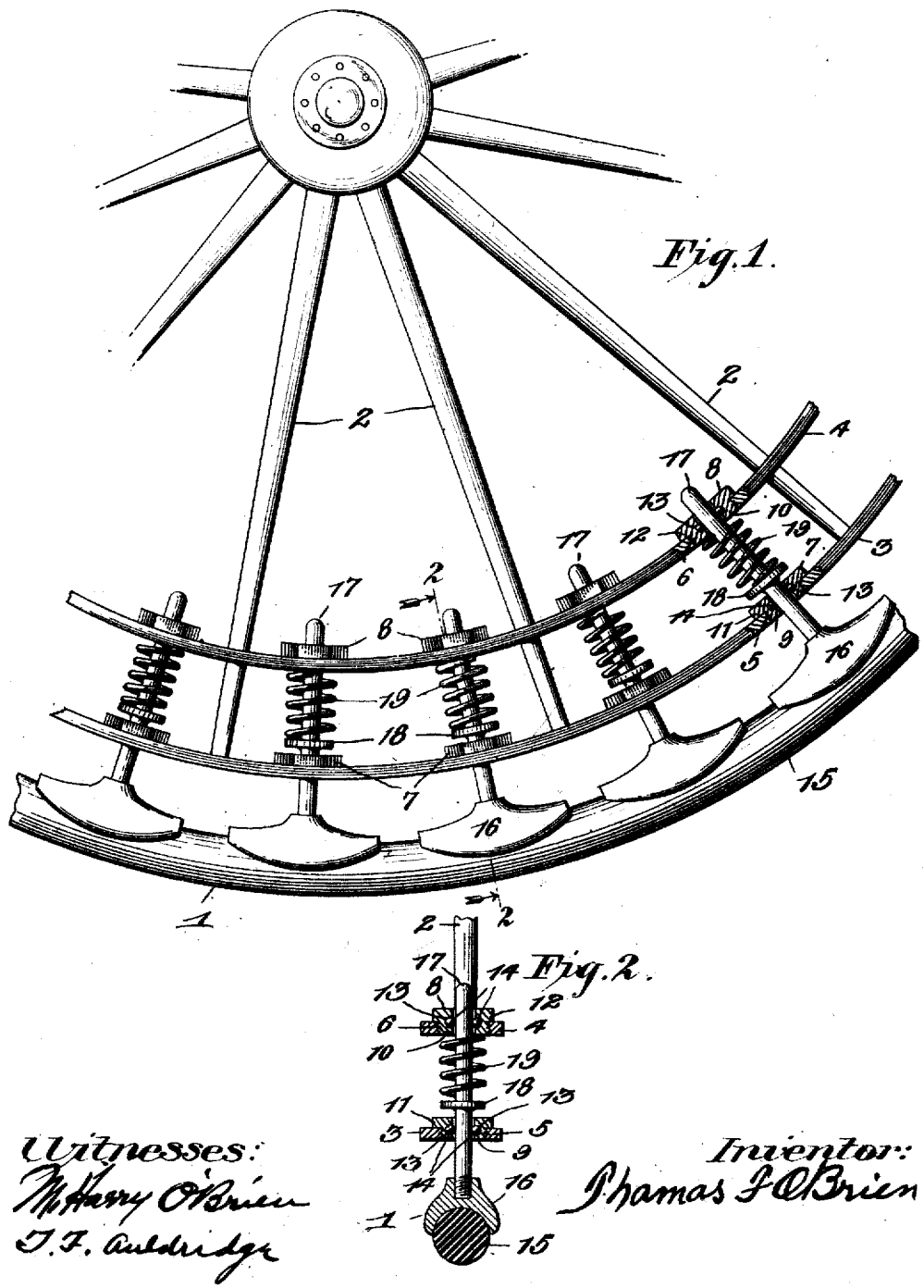

UNITED STATES PATENT OFFICE.

THOMAS F. O'BRIEN, OF HIGHMORE, SOUTH DAKOTA.

SPRING-FELLY AUTOMOBILE-WHEEL.

1,013,949.   Specification of Letters Patent.   Patented Jan. 9, 1912.

Application filed December 22, 1910. Serial No. 598,870.

*To all whom it may concern:*

Be it known that I, THOMAS F. O'BRIEN, a citizen of the United States, residing at Highmore, in the county of Hyde and State of South Dakota, have invented certain new and useful Improvements in Spring-Felly Automobile-Wheels, of which the following is a specification, reference being had to the accompanying drawings.

This invention is an improved spring wheel for automobiles and other vehicles, the object of the invention being to provide a wheel of this class in which the tire is carried by radially movable spring-cushioned felly sections which absorb shocks and enable the wheel to pass over uneven surfaces without jarring and jolting the automobile or other vehicle on which the same is employed and also enabling the use of pneumatic tires such as are commonly employed, to be dispensed with, the invention consisting in the construction, combination and arrangement of devices hereinafter described and claimed.

In the accompanying drawings Figure 1 is an elevation, partly in section, of a portion of a spring wheel constructed in accordance with my invention; and Fig. 2 is a detail sectional view of the same on the plane indicated by the line 2—2 of Fig. 1.

For the purposes of this specification the hub of the wheel is indicated at 1 and the spokes at 2.

In accordance with my invention I provide an outer rim 3 and an inner rim 4 which is spaced from and concentric with the outer rim, both of the rims being secured to the spokes. In practice, these rims are preferably made of steel. The outer rim is provided at points between the spokes with threaded openings 5. The inner rim is provided with similar, but larger threaded openings 6, the centers of the said openings of the said rims being in the same radii.

Boxing burs 7, 8 are respectively provided on their outer sides with cylindrical portions 9, 10 which are respectively engaged with the openings 5, 6 of the outer and inner rims so that the said boxings are detachably secured to the said rims, the inner portions of the boxings, or shoulders 11, 12, formed thereby, bearing respectively against the inner sides of the inner and outer rims. These boxings are provided with central openings, which are radial with vided with ball races 13 in which operate bearing balls 14.

The tire 15 which may be made of any suitable material but which is preferably, in practice, made of studded leather provided with a peripheral outer tire member, is carried by felly sections 16 which are hollowed on their outer sides to receive the inner side of the tire. Each of these felly sections is provided on its inner side at its center, with a radially threaded opening with which is engaged the outer end of a stem or rod 17. The said stems or rods pass through the openings in the boxing burs 7, 8 and are engaged by the bearing balls thereof and each of the said stems or rods is provided, at a point a suitable distance from the outer boxing bur, with a shoulder 18. A coil extensile spring 19 is placed on each stem or rod 17 and bears between the shoulder 18 and the inner boxing bur 8. Hence, the said springs cushion the stems or rods of the felly sections and press the latter outwardly against the tire so that the tire is firmly held on the outer side of the felly sections and yet the felly sections are radially movable and are cushioned by the said springs so that as the wheel revolves the spring cushioned sections on the under side of the wheel yield as the wheel passes over uneven surfaces and hence cause the vehicle to ride easily and smoothly and prevent the same from being jolted and jarred.

The diameter of the openings 6 and threaded cylindrical portions of the inner boxing burs is greater than that of the springs 19 so that after the said inner boxing burs have been removed the said springs and the rods or stems 17 may be removed through said openings, if the felly sections 16 have been first removed from the outer ends of the said stems or rods.

Having thus described my invention I claim:

In a wheel of the class described and provided with outer and inner spaced rims having threaded openings, outer and inner boxing burs respectively provided with threaded portions engaging the said openings of the rims, the said boxing burs being provided with radial alining openings, a tire, felly sections engaging the tire and provided with radial movable stems operating in the openings of the boxing burs, the said stems being each provided with a stop, and coil tween said stops and the inner boxing burs, the diameter of the stops and springs being less than that of the threaded openings of the inner rim, so that said springs and stems may be removed through said openings, after the said inner burs have been detached from the inner rim, the said felly sections being detachably connected to the outer ends of the said stems.

THOMAS F. O'BRIEN.

Attest:
M. HARRY O'BRIEN,
R. B. ROCKWELL.